Figure 1:
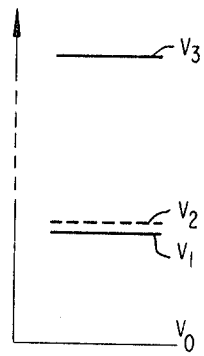

May 6, 1969 J. ROBIEUX ET AL 3,443,087

ISOTOPIC SEPARATION PROCESS

Filed Sept. 16, 1964

INVENTORS
JEAN ROBIEUX
JEAN-MICHEL AUCLAIR

BY Paul M. Craig, Jr.

ATTORNEY

United States Patent Office 3,443,087
Patented May 6, 1969

3,443,087
ISOTOPIC SEPARATION PROCESS
Jean Robieux, Chatenay-Malabry, and Jean-Michel Auclair, Limours, France, assignors to Compagnie Generale d'Electricite, Paris, France, a corporation of France
Filed Sept. 16, 1964, Ser. No. 396,860
Claims priority, application France, Oct. 21, 1963, 951,263
Int. Cl. H01j 39/36; B01d 59/44
U.S. Cl. 250—41.9                    14 Claims This invention relates to an isotopic separation process for uranium in particular but not exclusively. It also relates to a device for utilizing said process.

The separation of the isotope $U^{235}$ (which is fissionable by neutrons) from natural uranium, a binary mixture containing mainly non-fissionable $U^{238}$, or simply the enrichment of the mixture in $U^{235}$ are extremely important processes for nuclear applications. The only process now used on an industrial scale is the separation by diffusion through a porous barrier. A number of other processes (electromagnetic separation by using devices derived from the mass spectrometer, for instance the so-called "calutron," separation by centrifugation, by thermal diffusion . . .) have been used or suggested, but the separation factors thus obtained are very small.

A gaseous diffusion separation stage leads to a separation factor of about 1.002. Starting from natural uranium, for which the ratio $r=U^{235}/U^{238}$ is of the order of 0.7%, the obtaining of a product with an $r$ ratio equal to 95% will necessitate about 4,000 diffusion stages, i.e., a very large plant.

Therefore, in order to facilitate this process or enrichment, our present invention relates to a process and a device which makes it possible to ionize selectively a gaseous compound of an isotope which is part of a mixture of isotopes.

The process according to the invention implies essentially two steps, which are respectively an irradiation with a narrow band radiation association with another narrow band irradiation of a different wavelength. It is subsequently easy to separate by well-known means the particles of the ionized gas stream, which are therefore electrically charged.

In effect, according to the quantum theory and to the study of molecular spectra, a molecule may be in several different energy states, corresponding either to different electronic orbits or to different internuclear distances or to rotations of some elements of the molecules with respect to other elements. The optical spectra emitted when the molecule falls from one energy state to another are called respectively, according to the cause of this fall, electronic spectrum, vibration spectrum, rotation spectrum, compound spectra being possible (for instance, a vibration-rotation spectrum).

Besides, one knows that there exists for every molecule a stable configuration corresponding to minimum energy state. Almost all the molecules happed to be in this state, called ground state, with energy $W_0$. One knows also that under these conditions, they may reach another energy level of value $W_1$ by absorption of a radiation whose frequency is given by the difference of energy between the two states, the energy variation $W=W_1-W_0$ and the radiation frequency being related by Planck's equation: $W=h\nu$, where $\nu$ is the frequency and $h$ the quantum of action.

For a molecule of a given element, this excitation will occur for a particular value of the frequency of the exciting radiation, and for the molecule of a different element, but of similar structure, the corresponding excitation will occur for a different value of the excitation frequency.

This is the case in particular for a mixture of isotopes and more particularly for a mixture of two isotopic compounds made, for instance, with $U^{235}$ and $U^{238}$.

According to one feature of the process according to the invention, the mixture of isotopic compounds is exposed to a narrow band radiation called in practice monochromatic having the desired frequency for exciting the molecule of only one of the two compounds, the band being sufficiently narrow so as not to excite the other one. The permissible values for the spectrum width will be given thereafter.

The given isotopic mixture, in which the operation described above has generated excited states for the molecules of only one of the isotopic compounds, is subjected to a selective ionization process according to a principle which will be described with reference to FIGURE 1.

This figure shows a scale of the energy levels of the molecules (for instance in electron-volts). Level $V=0$ or $V_0$ corresponds to the ground state, which is the same for both types of molecules. Level $V_3$ is the ionized level. Level $V_1$ is the excited level of $U^{235}$, $V_2$ is the excited level of $U^{238}$. If the mixture is exposed to a radiation with an energy corresponding to the transition $(V_0/V_1)$, $U^{235}$ will be excited and will reach level $V_1$, but $U^{238}$ will not become excited and will remain at level $V_0$. If a radiation of conveniently selected energy is applied to the mixture in its present state, the excited molecules of energy level $V_1$ will jump to level $V_3$ and become ionized, while the molecules still at level $V_0$ will not reach level $V_3$ and will not become ionized. The energy of the second radiation must therefore be higher than $(V_3-V_1)$ but lower than $(V_3-V_0)$, as otherwise the non excited molecules would become ionized.

According to another feature of the invention, a mixture of isotopic compounds in which the molecules of one compound have been brought to an excited state while the molecules of the other compounds remain at the ground state, is subjected to an irradiation by a radiation the energy of which lies between two limits: the difference of energy between the ionized state and the ground state, and the difference of energy between the ionized state and the excited state of the molecules of said compound.

This invention will now be described in more detail with reference to FIGURE 2.

Figure 2:
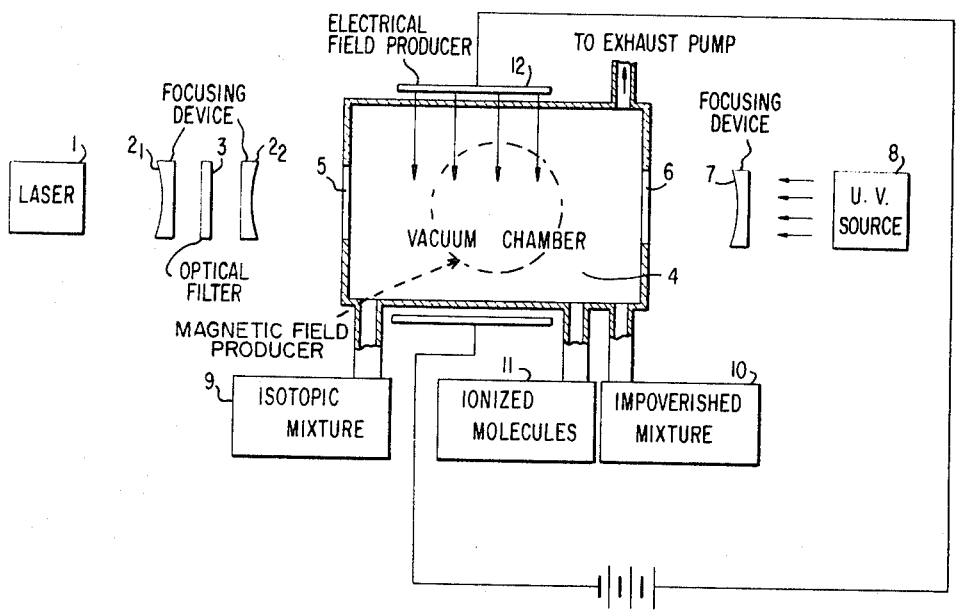

On FIGURE 2, 1 is a narrow band radiation source supplying the energy needed for exciting the molecules of one of the two isotopic compounds used.

On FIGURE 2, 4 is a chamber where a gaseous stream of uranium isotopic compounds, for instance uranium hexafluoride, $U^{235}F_6$ and $U^{238}F_6$, flows between inlet 9 and outlet 10. A first radiation is let into chamber 4 through window 5 from source 1 through a focusing device $2_1$, $2_2$. A second radiation originating from source 8 is let into chamber 4 through window 6 and focusing device 7. A filter 3 prevents the second radiation from reaching source 1. In this embodiment, the chamber is placed in an electric field 12. The molecules of compound $U^{235}F_6$ are excited by the first radiation, but not the molecules of $U^{238}F_6$. Only the ionized molecules are deflected in the electric field and are collected in duct 11. A mixture depleted in $U^{235}F_6$ escapes by outlet 10.

Naturally, it would be possible to use, without going beyond the scope of this invention, other isotopic compounds as well as different deflecting means: a magnetic field or a combination of electric and magnetic fields, or chemical reaction. A transverse magnetic field can be provided by magnetic pole pieces disposed on each side of the vacuum chamber. The magnetic pole pieces are shown by the dashed line in FIGURE 2.

An analysis of the conditions imposed upon the excita-
n radiation and on the ionizing radiation will be given
low and the characteristics required for the correspond-
; sources will be inferred therefrom.

The experimental study of the spectra shows that the
)topic displacements of the energy levels of some
anium compounds and in particular of $UF_6$, are im-
rtant in relative value for the vibration spectra. The
llowing results are obtained: the wavelengths to be used
ǝ in the infrared, of the order of a few microns, the
lative displacement is of the order of $10^{-3}$.

As concerns infrareds, one knows that the laser is able
supply a radiation having this monochromaticity. The
citation radiation may thus be advantageously supplied
' a laser.

On the other hand, the study of the ionisation potentials
the compounds under review shows that the ionization
diation must be in the ultraviolet and that its relative
dth must also be of the order of $10^{-3}$. But there is
) need for a laser in this case and the sharpness of a
ıe from any conventional source in the ultraviolet spec-
ım is better than $10^{-3}$. Any convenient ultraviolet
urce may be used.

The dimensions of the chamber, the strength of the
flecting field, the gas pressure and the gas stream veloci-
, the characteristics of the sources must be selected tak-
g into account the half-life of an excited state, of the
der of $10^{-8}$ sec. and of the half-life of an ionized state,
the order of $10^{-3}$ sec.

Irradiations may be applied either continuously or by
ılses.

Both processes, excitation and ionization, are partial.
ıerefore the device does not produce the pure fissile
ımpound but a mixture richer in the fissile compound
an the feed mixture.

It should be understood that the device described above,
hich is shown schematically on FIGURE 2, is a stage
: a plant consisting of several stages interconnected ac-
ırding to the methods of fractional purification with
processing of the gas stream enriched in $U^{235}F_6$ on
ıe one hand and of the depleted gas streams on the other.

Naturally, the invention is not limited to the embodi-
ent described and shown here, which is given only by
ay of example.

We claim:
1. A method for separating isotopes of a gaseous mix-
ıre containing a first isotope having a first excitation en-
gy level and a second isotope having an excitation energy
vel higher than said first excitation energy level which
ımprises subjecting said gaseous mixture to radiation
nitted by a first radiation source at a predetermined fre-
uency that excites the molecules of the first isotope but
ot the molecules of the second isotope, subjecting said
aseous mixture to radiation emitted by a second radia-
on source at a predetermined frequency which ionizes
the excited molecules of the first isotope but not the non-
excited molecules of the second isotope, exposing said
gaseous mixture to a field which selectively deflects the
ionized molecules in said mixture, and separating said
ionized molecules from the nonionized molecules.

2. The method of claim 1, wherein the radiation
emitted by said first radiation source is in the infrared
spectrum and the radiation emitted by said second ioniza-
tion radiation source is in the ultra-violet spectrum.

3. The method of claim 2, wherein the radiations are
applied continuously.

4. The method of claim 2, wherein the radiations are
applied in pulses.

5. The method of claim 2, wherein said first radiation
source is a laser, the wavelength of which is in the order
of a few microns, and the relative energy level displace-
ment is of the order of about $10^{-3}$.

6. The method of claim 2, wherein said ultraviolet
radiation has a relative bandwidth of about $10^{-3}$.

7. The method of claim 1, wherein the isotopes of
said gaseous mixture which are separated from each other
are $U_{235}$ and $U_{238}$.

8. The method of claim 1, wherein the first radiation
source emits a narrow band radiation having a frequency
sufficient to excite only said first isotope, but insufficient
to excite said second isotope.

9. The method of claim 8, wherein said narrow band
is monochromatic.

10. The method of claim 1, wherein the gaseous mix-
ture to be treated contains $U_{235}F_6$ and $U_{238}F_6$.

11. The method of claim 1, wherein the radiated
gaseous mixture is exposed to an electrical field.

12. The method of claim 1, wherein the radiated
gaseous mixture is exposed to a magnetic field.

13. The method of claim 1, wherein the radiated
gaseous mixture is exposed to a combination of an elec-
trical field and a magnetic field.

14. The method of claim 1, wherein said gaseous mix-
ture contains isotopic compounds and wherein the sec-
ond radiation source emits radiation having a frequency,
the value of which is between the ionization frequency
of the second isotope and the difference between the
ionization frequency and the excitation frequency of the
first isotope.

References Cited

UNITED STATES PATENTS

| | | | |
|---|---|---|---|
| 2,642,535 | 6/1953 | Schroeder | 250—41.9 |
| 2,901,625 | 8/1959 | Friedman et al. | 250—43.5 |
| 2,950,387 | 8/1960 | Brubaker | 250—41.9 |

WILLIAM F. LINDQUIST, *Primary Examiner.*

U.S. Cl. X.R.

55—2